(12) United States Patent
Diez et al.

(10) Patent No.: US 7,311,310 B2
(45) Date of Patent: Dec. 25, 2007

(54) CYLINDER HEAD GASKET

(75) Inventors: Armin Diez, Lenningen (DE); Tobias Gruhler, Pfullingen (DE); Ulrich Werz, Dettingen (DE); Peter Schenk, Hohenstein (DE)

(73) Assignee: Elring Klinger AG, Dettingen (DE)

( * ) Notice: Subject to any disclaimer, the term of this patent is extended or adjusted under 35 U.S.C. 154(b) by 279 days.

(21) Appl. No.: 11/114,959

(22) Filed: Apr. 26, 2005

(65) Prior Publication Data

US 2005/0269790 A1     Dec. 8, 2005

(30) Foreign Application Priority Data

May 29, 2004   (DE) .................... 10 2004 026 395

(51) Int. Cl.
*F02F 11/00* (2006.01)
(52) U.S. Cl. .................. 277/594; 277/595; 277/593
(58) Field of Classification Search ........ 277/591–596; 264/220
See application file for complete search history.

(56) References Cited

U.S. PATENT DOCUMENTS

| | | | | |
|---|---|---|---|---|
| 4,878,678 | A * | 11/1989 | Hensley et al. | ............ 277/650 |
| 5,403,532 | A * | 4/1995 | Stecher et al. | ............ 264/219 |
| 6,918,597 | B2 * | 7/2005 | Egloff | ............ 277/594 |
| 2001/0052674 | A1 * | 12/2001 | Egloff | ............ 277/591 |
| 2003/0080514 | A1 | 5/2003 | Barclay et al. | ............ 277/598 |

FOREIGN PATENT DOCUMENTS

| | | | |
|---|---|---|---|
| DE | 4111791 | * | 10/1992 |
| DE | 102 24 856 A1 | | 1/2004 |
| EP | 0 757 195 B1 | | 2/1997 |
| EP | 1 350 992 A2 | | 10/2003 |

\* cited by examiner

*Primary Examiner*—William L. Miller (57) ABSTRACT

In order to achieve good sealing in both a cold and a warm engine by sealing features which are as simple as possible, an at least substantially metallic cylinder head gasket comprises a gasket plate with only one layer of sheet steel extending over the entire gasket plate, and around each combustion chamber opening of the gasket plate, a combustion chamber sealing element forming on at least one side of the gasket an elevation with a gasket sealing surface surrounding the combustion chamber opening in a closed manner for being pressed against an engine component sealing surface. The height profile of the gasket sealing surface corresponds prior to installation of the gasket to the topography of the sealing gap to be sealed off by the gasket when the gasket is installed, and the elevation has a metallic main body whose material is selected and whose cross section is designed such that the main body will not be deformable in its height under the maximum load occurring when the cylinder head gasket is installed and the engine is operating. At least one sealing bead is provided in the gasket plate, which surrounds at least one fluid opening of the gasket in a closed manner and is elastically deformable in its height.

16 Claims, 7 Drawing Sheets

CYLINDER HEAD GASKET

The present disclosure relates to the subject matter disclosed in German Application No. 10 2004 026 395.7 of May 29, 2004, which is incorporated herein by reference in its entirety and for all purposes.

BACKGROUND OF THE INVENTION

The invention relates to an at least substantially metallic cylinder head gasket.

The metallic cylinder head gaskets currently in use have a gasket plate which is essentially formed by a single sheet metal layer consisting of sheet spring steel or of several layers of sheet steel superimposed on one another, with at least one layer thereof consisting of sheet spring steel. Around the combustion chamber openings and fluid openings (the latter for coolant and/or engine oil) that are to be sealed off, the layer of sheet steel or at least one of the layers of sheet steel has stamped sealing beads which are capable of undergoing spring-elastic deformation in a direction perpendicular to the gasket plate so as to maintain the pressure required for the sealing effect around the openings of the cylinder head gasket that are to be sealed off, when, upon tightening the cylinder head screws and during operation of the engine, the engine component sealing surfaces of cylinder head and engine block, which are flat prior to installation of the gasket, undergo deformation and no longer constitute flat surfaces. Such metallic cylinder head gaskets are disclosed, for example, in U.S. Pat. No. 5,582,415.

A completely different operational principle of a substantially metallic cylinder head gasket is disclosed in EP-0 485 693-B1 or the corresponding U.S. Pat. No. 5,391,333. According to this, a cylinder head gasket comprises a one-piece metallic gasket plate, whose main surfaces facing the engine component sealing surfaces have a specific topography with its form based on the following consideration: the engine block (crankcase) and the cylinder head cannot be regarded as absolutely rigid components for the function of a cylinder head gasket. Rather, the tightening of the cylinder head screws and the changing gas pressures in the combustion chambers during operation of the engine cause sagging of these engine components, i.e., result in the sealing gap delimited by the engine component sealing surfaces and accommodating the cylinder head gasket for sealing it not maintaining the form of a thin plane-parallel plate. However, the locally varying component rigidity of these two engine components in areas adjoining their sealing surfaces also influences the topography of the engine component sealing surfaces delimiting the sealing gap during operation of the engine. The shape of the gasket plate of the cylinder head gasket according to EP-0 485 693-B1 is based on the basic concept of adapting the shape of the gasket plate of the cylinder head gasket in the areas effective for the sealing to the topography of the engine component sealing surfaces, as prevails after the tightening of the cylinder head screws, i.e., after installation of the cylinder head gasket, and of not allowing the elastic component deformations required for maintaining the sealing during operation of the engine to occur on or in the cylinder head gasket but instead on or in the engine components engine block and cylinder head, so that the gasket plate of the cylinder head gasket can be made from a material which is stable when tightening the cylinder head screws and during operation of the engine, i.e., is not deformable in its thickness. This basic concept underlying the design of a cylinder head gasket does, of course, not exclude providing the gasket plate with a plastic coating, for example, for the purpose of so-called microsealing, which can be adapted to surface roughnesses of the engine component sealing surfaces.

There are cases where cylinder head gaskets are used, in which a gasket with a topographically designed gasket plate which at least in its areas serving for sealing is to be regarded as rigid does not produce optimum results: above all, modern diesel engines of lightweight construction cannot be reliably sealed with a cylinder head gasket designed strictly according to the teaching of EP-0 485 693-B1 with both a cold and a warm engine, for the following reason: if the cylinder head gasket is designed so that the engine is tight in the cold state, the cylinder pipes (the wall areas enclosing the combustion chambers in the engine block) expanding to the greatest extent in a direction perpendicular to the sealing gap between cylinder head and engine block in the course of reaching the operating temperature of the engine lead to the cylinder head being raised and at a spacing from the combustion chamber openings of the cylinder head gasket being lifted off the latter, with the result that the lubricating oil and coolant passages passing through the cylinder head gasket become untight. In addition, the very different temperature expansion coefficients of the materials of engine block (usually gray cast iron) and cylinder head (light metal alloys) in such engines with the unavoidable changes in temperature of the engine during operation of the engine lead to relatively large sliding movements of the engine component sealing surfaces of cylinder head and engine block relative to one another and relative to the cylinder head gasket in the plane of the sealing gap to be sealed by the cylinder head gasket and thus to detrimental wear occurring, above all, on the cylinder head.

A cylinder head gasket is now proposed by the invention, which eliminates the sealing problem described hereinabove and nevertheless has the major advantages of a cylinder head gasket with a single-layered metallic gasket plate with sealing areas which are stable, i.e. not deformable in their height, in accordance with EP-0 485 693-B1, around the combustion chamber openings of the gasket plate.

SUMMARY OF THE INVENTION

The invention relates to a cylinder head gasket for sealing off a sealing gap delimited by engine component sealing surfaces of at least one cylinder head and an engine block, the cylinder head gasket comprising a substantially metallic gasket plate with at least one combustion chamber opening, screw openings for cylinder head screws and at least one fluid opening for passage of a fluid medium such as coolant or lubricating oil and being characterized in accordance with the invention by the following features:

(a) the gasket plate has only one layer of sheet steel extending over the entire gasket plate;

(b) a combustion chamber sealing element is provided around the combustion chamber opening, the combustion chamber sealing element forming on at least one side of the cylinder head gasket an elevation with a gasket sealing surface surrounding only this combustion chamber opening in a closed manner for being pressed against at least one of the engine component sealing surfaces, the height profile of the gasket sealing surface being formed prior to installation of the cylinder head gasket so as to correspond at least approximately to the topography of the sealing gap to be sealed off as a result of clamping of the cylinder head gasket between engine component sealing surfaces (sealing gap topography), the elevation having a metallic main body whose material is selected and whose cross section is designed such that the main body is pressure-resistant and creep-resistant and therefore not deformable in its height under the maximum load occurring with the cylinder head gasket installed and the engine operating;

(c) for the fluid opening, the gasket plate is provided with at least one sealing bead surrounding the at least one fluid opening in a closed manner and being elastically deformable over its entire length in a direction perpendicular to the gasket plate.

Development of the cylinder head gasket according to the invention was based on the consideration that the critical locations for the sealing are the areas around the combustion chamber openings, as it is there that the medium under the highest pressures is to be sealed off and the highest surface pressures acting on the gasket are required, so that the cylinder head screws have to be tightened so strongly that the elevations of the gasket enclosing the combustion chamber openings are pressed to a sufficient extent in all operating states of the engine. For the sealing around the fluid openings, on the other hand, beads which are elastically deformable in their height at least within certain limits, and which prevent loss of the sealing effect around the fluid openings as the engine heats up, are adequate.

When hereinabove and in the patent claims reference is made to the topography of the sealing gap which occurs when the cylinder head gasket is clamped between the engine component sealing surfaces and is defined by these engine component sealing surfaces, this can be taken to mean the sealing gap topography when the engine is stationary and cold, or the sealing gap topography when the engine is operating at its full power (full load) or the sealing gap topography when the engine is operating under partial load, depending on whichever state of the engine it is in which the sealing of the sealing gap by means of the cylinder head gasket is most critical. As each cylinder head gasket is designed for a specific engine, so that the gasket designer is familiar with this engine and the materials used for the engine components, the (at least predominantly elastic) deformations of the engine component sealing surfaces under the action of pressing forces occurring when clamping the cylinder head gasket and the temperature-dependent thermal expansions of the engine components and the resulting deformations of the engine component sealing surfaces can be calculated by the known finite element method, which means that the sealing gap topography and the locally different pressing forces occurring between the engine component sealing surfaces and the cylinder head gasket can be calculated for each operating state of the engine. Consequently, for a certain engine specified to the gasket designer it is also possible to calculate in which operating state of this engine the sealing of the sealing gap between the engine component sealing surfaces by the cylinder head gasket is most critical, so that the height profile of the combustion chamber sealing element of a cylinder head gasket according to the invention can be determined for this particularly critical operating state by the finite element method. For an engine in which the sealing gap topography is altered to a considerable extent for the sealing of the sealing gap by the thermal expansion of the engine components during operation of the engine, it may, therefore, be recommendable to design the height profile of the combustion chamber sealing element of a cylinder head gasket according to the invention in accordance with a sealing gap topography which corresponds approximately to a mean value from the sealing gap topography of the cold engine and the sealing gap topography of the hot engine operating under full load, with deviations of up to ±25% from the exact mean value being regarded as falling within the scope of the invention.

The following is to be noted in conjunction with the above definition of the invention: instead of a single cylinder head, one cylinder head could also be provided for each individual cylinder of a multicylinder engine, as is often the case with commercial vehicle engines. The above-mentioned engine component sealing surfaces may not only be formed by the engine block and at least one cylinder head, but, for example, also by a chain case part or several chain case parts, in which case the cylinder head gasket comprises a chain case opening, around which a bead which is elastically deformable in its height may likewise be used for sealing purposes. The beads may then be so-called full beads with an approximately U-shaped or circular arch-shaped cross section or so-called half beads, whose cross section corresponds to a step or a Z drawn out in its length. One will advantageously provide the elevations enclosing the combustion chamber openings not only on one side of the cylinder head gasket but on both sides of the gasket, so that the thickness profile of the gasket there will then correspond in design to the sealing gap topography. The gasket plate may be provided on one or both sides completely or areawise with a plastic coating, and, in addition to the layer of sheet steel extending over the entire gasket plate, comprise one or a plurality of further layers of sheet metal extending over only part of the gasket plate. When hereinabove mention is made of the fact that the elevations provided on the gasket plate comprise a metallic main body, the latter may be a part differing from the layer of sheet steel or an area of the layer of sheet steel formed by stamping, but also an area of the layer of sheet steel on which an overlay was placed to form the elevation. Finally, mention is made of the fact that the above-mentioned main body need not be pressure-resistant all around the combustion chamber opening, but may be elastically and/or plastically deformable in its height within narrow limits in small areas, although such embodiments are not preferred. The sealing gap topography may be formed on the metallic main body itself, but, in principle, it is also possible to provide this with a stable coating, which forms the gasket sealing surface, and the thickness of which varies in accordance with the sealing gap topography. Finally, it is also to be seen as falling within the scope of the invention that the gasket plate has at least one further layer of sheet metal extending over the entire gasket plate or only over part or parts of the gasket plate, although such gaskets are not to be regarded as preferred embodiments of the invention.

Owing to the fact that when the cylinder head gasket is installed and the engine is in operation, around the combustion chamber openings of the gasket the highest risk for the occurrence of detrimental wear is on the engine components, above all, on the cylinder head, and on the cylinder head gasket, caused, above all, by sliding movements owing to very different temperature expansion coefficients of the materials of cylinder head and engine block in combination with high surface pressures between the engine component sealing surfaces and the cylinder head gasket, precisely with a cylinder head gasket according to the invention with combustion chamber sealing elements which are not deformable in their height, it is proposed, in accordance with the invention, that the main body of a combustion chamber sealing element or the combustion chamber sealing elements be provided in the area of the gasket sealing surface with anti-abrasion means which either ensure easy displaceability of the areas of the gasket and, in particular, of the cylinder head that lie against one another, or minimize or totally prevent sliding movements between the gasket and the sealing surface of at least the cylinder head. This aim is achieved by providing the main body of a combustion chamber sealing element in the area of the gasket sealing surface with a slide layer or with a coating which increases the sliding friction in relation to the adjacent engine component sealing surface. Finally, it is also possible for the main body to have in the area of the gasket sealing surface a surface profile for preventing sliding movement in relation to the adjacent engine component sealing surface. The surface profile is preferably formed by ribs and grooves enclosing the combustion chamber opening in the shape of rings, with their profile corresponding, for example, to a triangle or a saw tooth. The combustion gases cannot traverse such ring-shaped ribs and/or grooves. The main body may be provided with a coating of an elastomeric material for microsealing purposes, which does not level the surface profile and, of course, must not negate the "clinging effect" of the surface profile.

The sheet metal layer provided with the sealing bead or sealing beads may, as is known per se, consist in its entirety of a sheet of spring steel. It is, however, also conceivable to use a different sheet steel, to stamp the sealing bead therein and to then subject the sheet only in the area of the sealing bead to such heat treatment that it acquires spring-elastic properties in the area of the sealing bead.

In particular, in a multicylinder engine the cylinder head sealing surface already gets distorted when tightening the cylinder head screws, for the following reason: the screw openings of a cylinder head gasket provided for a multicylinder engine usually lie immediately in front of the gusset-shaped areas occurring between adjacent combustion chamber openings, and the screw openings adjacent to the narrow sides of the gasket lie at corresponding locations beside the combustion chamber openings at the end. Consequently, the cylinder head screws adjacent the aforementioned gussets are respectively associated with two combustion chamber openings, while the cylinder head screws adjacent to the narrow sides of the gasket are only associated with the combustion chamber openings at the end, with the result that the clamping forces for each combustion chamber opening at the end are equivalent to three cylinder head screws, but the clamping forces for each other combustion chamber opening only to two cylinder head screws. Since, in addition, as mentioned above, engine block and cylinder head may not be considered as absolutely rigid components, the clamping forces for the cylinder head gasket are greatest in the area of the cylinder head screws and decrease as the spacing from the cylinder head screws increases, as the engine components between the cylinder head screws attempt to elastically evade the pressures exerted by the cylinder head gasket on the engine component sealing surfaces. There are additional effects (above all, on the cylinder head) of temperature-related component expansions and of the high gas pressures prevailing in the combustion chambers on the cylinder head, which have the tendency to cause the cylinder head between the narrow side areas of the cylinder head gasket to arch upwards, i.e., away from the engine block.

To counteract such distortions of the engine components, in particular of the cylinder head, it is proposed that the gasket plate be provided at a spacing from the combustion chamber opening or the combustion chamber openings and their combustion chamber sealing elements with at least one elevation forming a support for the cylinder head and/or the engine block, which preferably has a height profile corresponding to the sealing gap topography. If the screw openings for the cylinder head screws are located in the immediate vicinity of the combustion chamber sealing elements, such supporting elevations are not required in the area of the screw openings, but at a distance from the combustion chamber sealing elements, in particular at the periphery of the gasket plate. However, in the case of screw openings lying at larger distances from the combustion chamber sealing elements, supporting elevations are preferably provided in the area of the screw openings.

Further features, advantages and details of the invention will be apparent from the following description and the appended drawings of several preferred embodiments of the cylinder head gasket according to the invention.

DETAILED DESCRIPTION OF THE INVENTION

Figure 1:
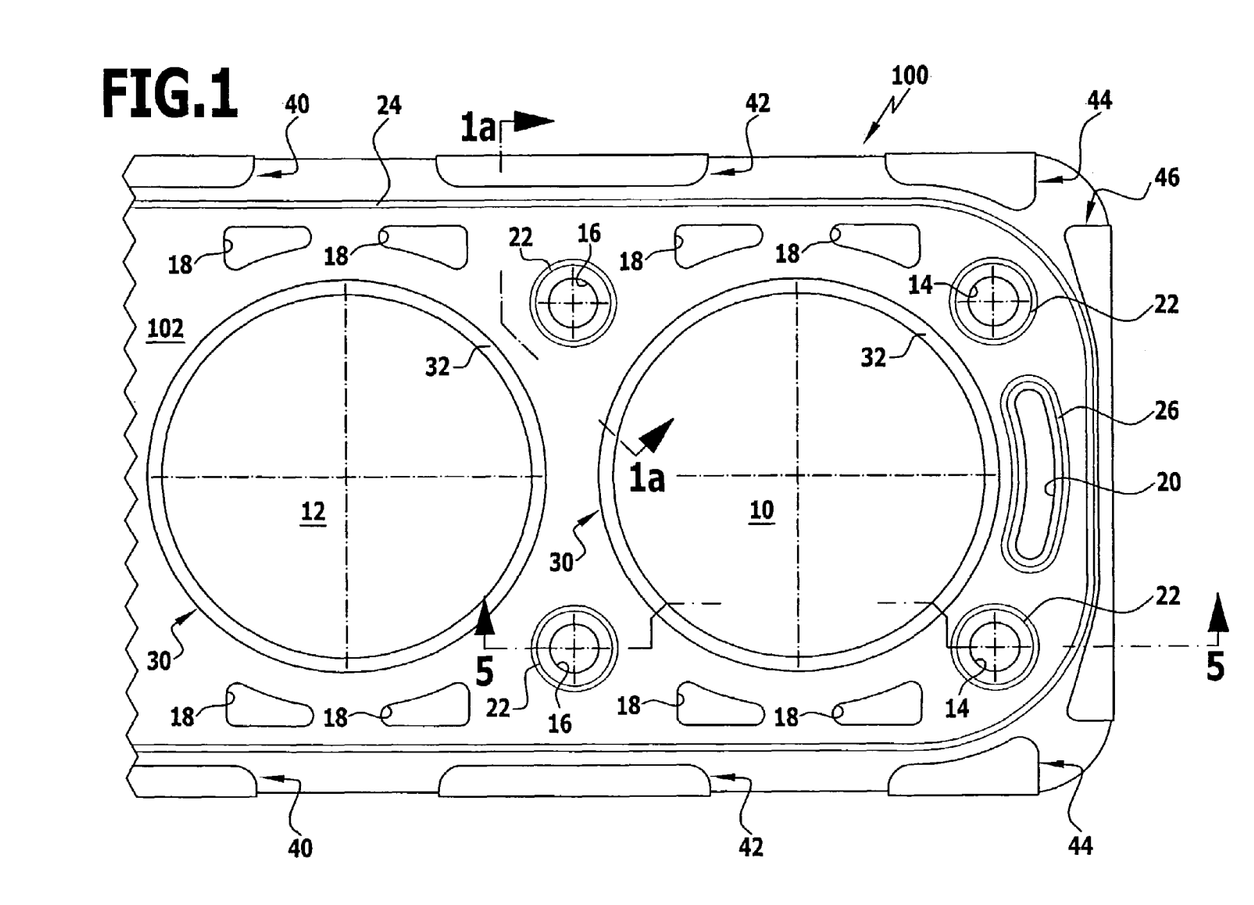
FIG. 1 shows a plan view of a section of a first embodiment of the cylinder head gasket according to the invention.

The cylinder head gasket shown in FIG. 1 consists of a single, one-piece sheet metal layer forming a gasket plate 100 in which a plurality of combustion chamber openings 10 and 12, screw holes 14 and 16, water holes 18 and a plurality of oil holes 20 are formed. The cylinder head gasket shown is intended for an in-line multicylinder engine, and FIG. 1 shows only a section of the gasket with two combustion chamber openings and only some of the holes 14, 16, 18 and 20. The combustion chamber opening for an end cylinder was designated 10, the combustion chamber opening for an intermediate cylinder 12, the screw holes adjacent to a narrow side of the gasket plate 100 were designated 14, and the screw holes, each associated with two combustion chamber openings, 16.

Figure 1A:
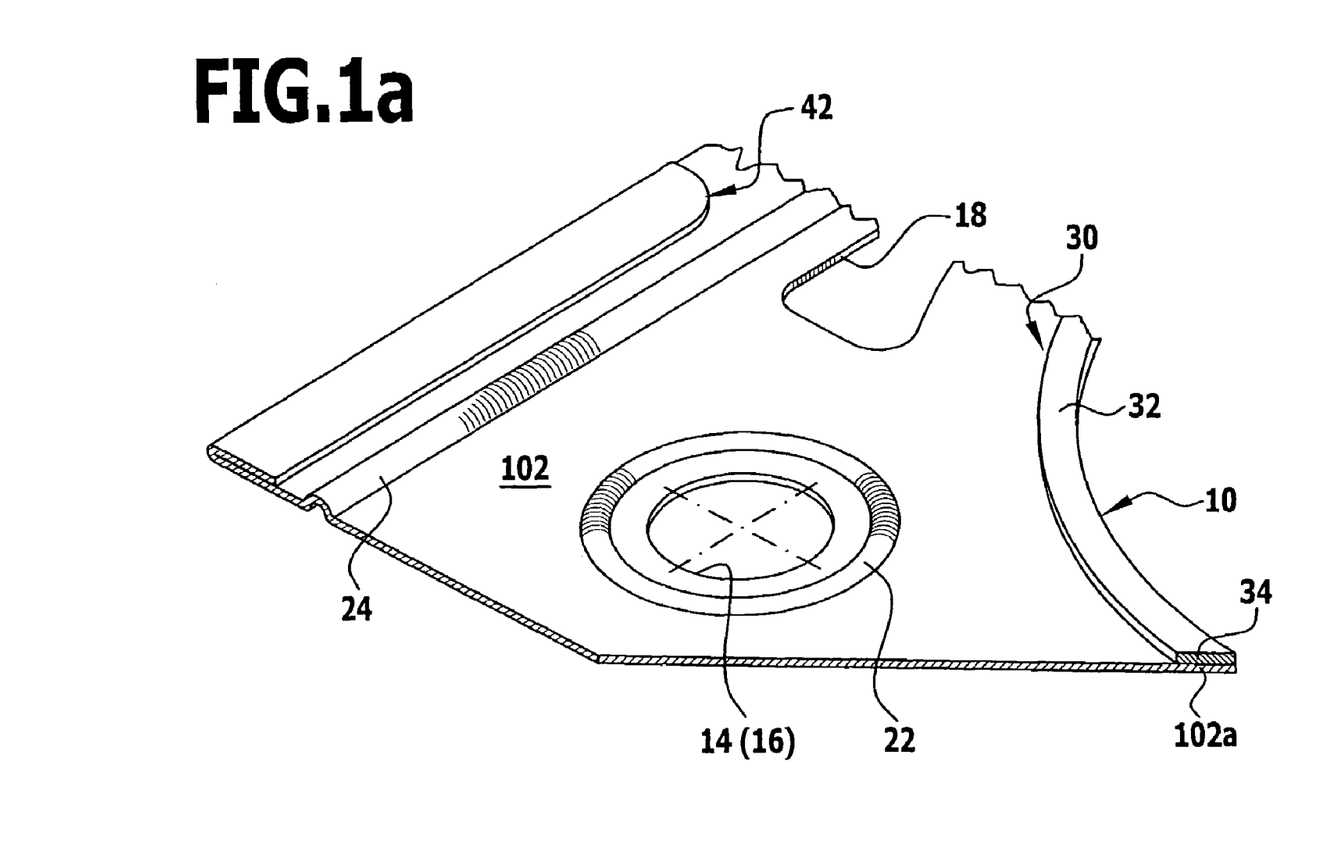
FIG. 1a shows an area of the first embodiment in an isometric section corresponding to line 1a-1a in FIG. 1.

As is apparent from FIGS. 1 and 1a, each of the screw holes 14, 16 is enclosed by a circular ring-shaped bead 22. This is a full bead which is elastic in its height and is stamped into the actual sheet metal layer 102 of the gasket plate 100, which consists of sheet spring steel. There is also stamped into the gasket plate 100 a watertight bead 24 which is similarly elastic in its height (i.e. elastically deformable in its height). This is likewise intended to be a full bead which extends in the proximity of and around the periphery of the gasket plate 100. In a plan view of the gasket plate 100, the watertight bead 24 constitutes an approximately oval structure closed within itself and encloses all combustion chamber openings, screw holes, water holes and oil holes. Finally, sealing beads 26 which are elastic in their height are stamped into the gasket plate 100. These are likewise in the form of full beads which respectively surround the oil holes in a closed manner and serve to seal off the oil holes. Only one of the sealing beads 26 is shown in FIG. 1. In the illustrated embodiment, all beads 22, 24 and 26 project above one and the same main surface of the gasket plate 100, i.e., their convex sides face the viewer of FIG. 1. Finally, mention is made of the fact that the beads 22, 24 and 26 need not be full beads. Rather, these could also be so-called half beads, with the step formed by such a half bead 22 and 26, respectively, starting from the associated hole 14, 16 and 20, respectively, projecting in the bead area in the direction towards the viewer of FIG. 1, and the step formed by the watertight bead 24 starting from the rim of the gasket plate 100 and rising in the direction towards the viewer of FIG. 1.

Around each of the combustion chamber openings 10 and 12, the gasket plate 100 is provided with a circular ring-shaped combustion chamber sealing element 30 which in the illustrated first embodiment of the cylinder head gasket according to the invention consists of a circular ring-shaped region 102a of the sheet metal layer 102 and a sheet steel ring 34 placed on this region. The combustion chamber sealing element 30 consequently forms on the side of the gasket facing the viewer of FIG. 1 an elevation with a gasket sealing surface 32 which surrounds the respective combustion chamber opening in a closed manner and with which the cylinder head gasket is to be pressed against the sealing surface of a cylinder head. The sheet steel ring 34 is firmly connected to the sheet metal layer 102, in particular, by spot welding or preferably by a continuous laser weld seam extending closed within itself along the entire combustion chamber sealing element 30. On its side facing the viewer of FIG. 1, the sheet metal ring 34 may be provided with a coating which is not illustrated. In this case, this coating forms the gasket sealing surface 32, and the above-mentioned circular ring-shaped region 102a of the sheet metal layer 102 together with the sheet steel ring 34 forms a main body of the elevation.

At the periphery of the gasket plate 100, the latter is provided area-wise with supporting elevations 40, 42, 44, 46, more particularly, on the side of the gasket plate 100 facing the viewer of FIG. 1, and, with the cylinder head gasket installed, this side is to face the cylinder head. As is apparent from FIG. 1a, in the illustrated embodiment these supporting elevations are formed by sheet metal lugs of the layer of sheet steel 102 forming the gasket plate 100, which are reversed through 180° and are thus folded back onto the layer of sheet steel. These supporting elevations counteract a deformation of the sealing surface of the cylinder head which is flat prior to assembly—otherwise when tightening the cylinder head screws the cylinder head sealing surface at the periphery of the cylinder head gasket would be pulled downwards to an undesired extent, i.e., in the direction towards the engine block, and, above all, in the area of the narrow sides of the cylinder head or the cylinder head gasket, and, therefore, relatively long supporting elevations 46 are provided there.

In accordance with the invention, the gasket sealing surfaces 32 of the combustion chamber sealing elements 30 have a height profile which at least approximately reflects the topography of the sealing gap to be sealed off, which occurs between the sealing surfaces of cylinder head and engine block in the areas of the combustion chamber sealing elements when the cylinder head gasket is installed. As the differences in height of this height profile are typically approximately 50 μm at the most, this height profile cannot be represented in the drawings. Since the designer of a cylinder head gasket is always familiar with the engine belonging to the latter and with its materials and operating parameters, the topographies of the sealing surfaces of the cylinder head and the engine block, which delimit the aforementioned sealing gap, and hence the height profiles of the gasket sealing surfaces 32 can be calculated with the known finite element method (FEM), for both the stationary cold engine and the engine under partial load or full load—the topography of the engine component sealing surfaces and hence of the sealing gap delimited by these can therefore also be calculated for both the cold engine and the engine operating at full power (full load) or under partial load.

It is preferable for the supporting elevations 40, 42, 44, 46, but possibly only some of or only one of these supporting elevations, to also have a height profile corresponding to the sealing gap topography. The screw forces which decrease as the spacings from the screw holes increase and the locally varying component rigidities of the engine components, above all, of the cylinder head, are taken into account by these height profiles, above all, for the purpose of making uniform the surface pressures acting on the combustion chamber sealing elements around the combustion chamber openings.

In conjunction with the embodiment of the cylinder head gasket according to the invention shown in FIG. 1, mention is also made of the fact that a sealing bead closed within itself could, of course, also be respectively provided around the water holes 18 if one wishes to prevent those areas of the cylinder head gasket lying between the combustion chamber sealing elements 30, the watertight bead 24 and the beads 22 enclosing the screw holes from being flooded with cooling water. If corrosion problems at the cylinder head screws and at the bores in cylinder head and engine block receiving these can be excluded, the beads 22 enclosing the screw holes can be dispensed with.

Figure 2:
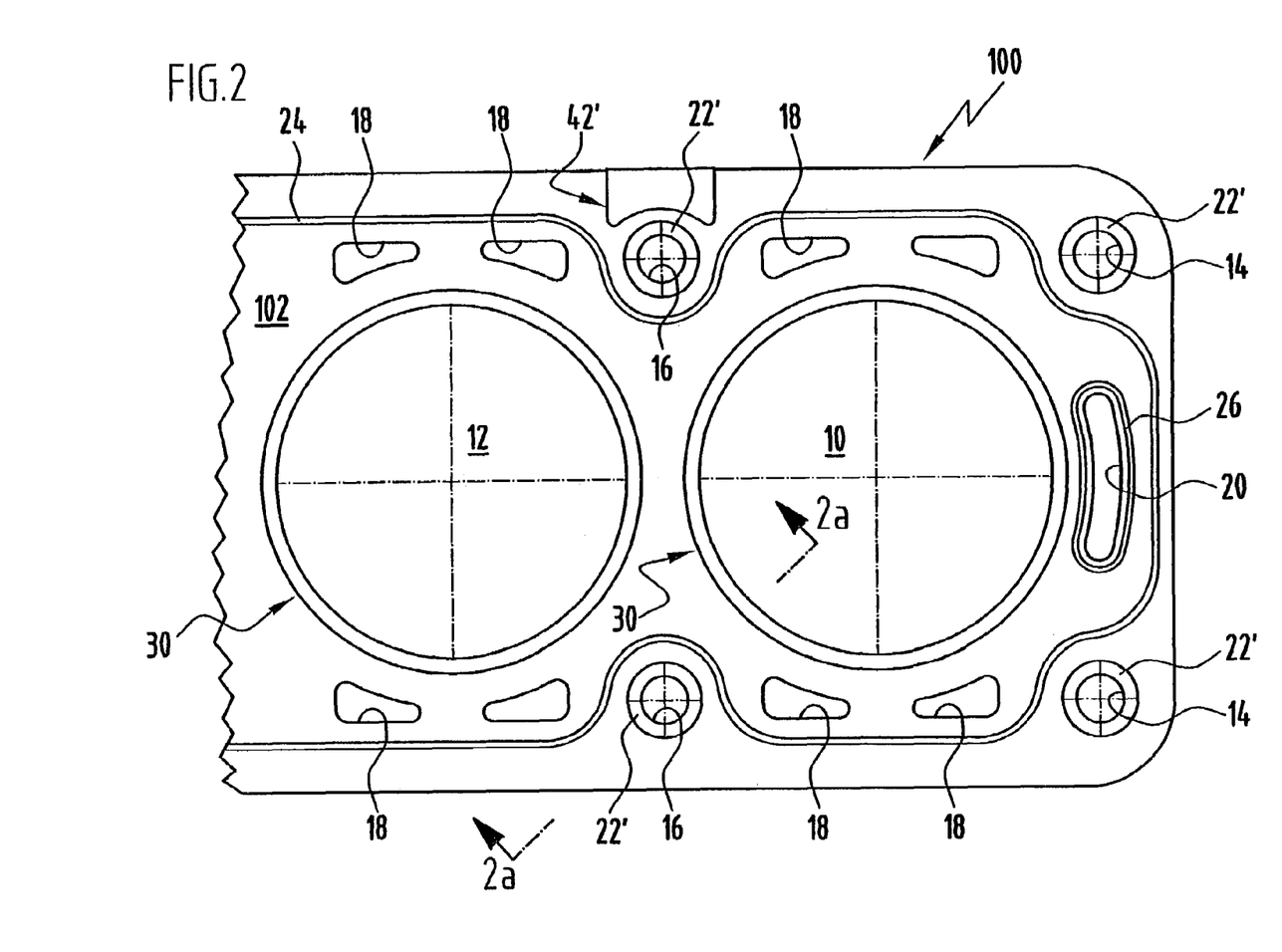
FIG. 2 shows a plan view of a section of a second embodiment of the cylinder head gasket according to the invention.
Figure 2A:
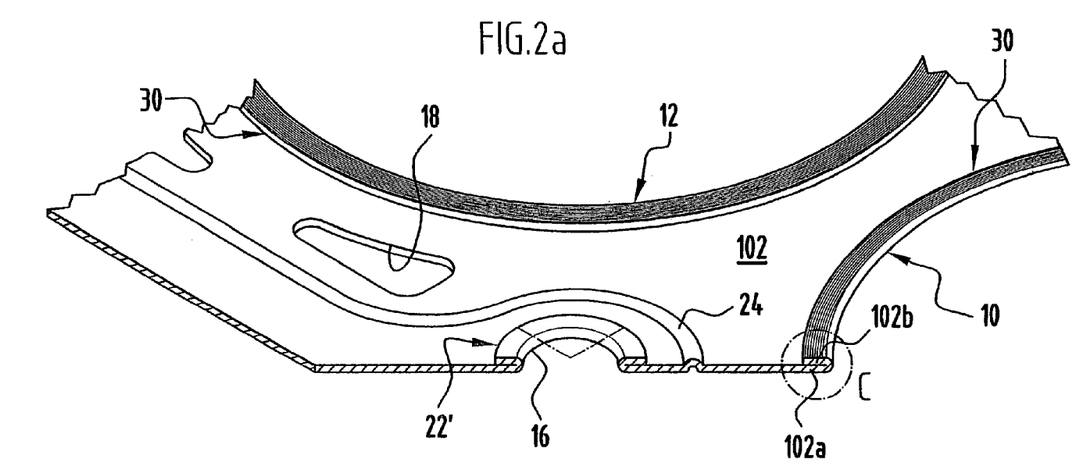
FIG. 2a shows a representation, corresponding to FIG. 1a, of the second embodiment corresponding to the sectional line 2a-2a in FIG. 2.

The same reference numerals as in FIGS. 1 and 1a were used in FIGS. 2 and 2a for elements which are also present in the first embodiment shown in FIGS. 1 and 1a. The second embodiment shown in FIGS. 2 and 2a will only be described hereinbelow insofar as it differs from the first embodiment according to FIGS. 1 and 1a.

As will be apparent from FIG. 2, the screw holes 14 and 16 in the second embodiment lie outside of the watertight bead 24 and are at greater distances from the combustion chamber sealing elements 30 than the screw holes of the first embodiment. For this reason, the screw holes 14 and 16 of the second embodiment have associated therewith supporting elevations 22', which are preferably ring-shaped (in a plan view of the cylinder head gasket) and surround the screw holes in a closed manner. The supporting elevations 22' also project above the same side of the gasket plate 100 as the combustion chamber sealing elements 30. As indicated in the center at the top of FIG. 2, the supporting elevation associated with a screw hole could, however, also be constructed like the supporting elevations 40, 42, 44, 46 of the first embodiment so as to produce a supporting elevation designated 42' in FIG. 2 at the periphery of the gasket plate 100. In this context, attention is called to the fact that in the second embodiment shown in FIG. 2, further supporting elevations corresponding to the supporting elevation 42' can, of course, be provided at other locations of the gasket plate. Furthermore, mention is made in this context of the fact that the supporting elevations may also be in the form of, for example, metallic overlays, which are joined, for example, by spot welding to the layer of sheet steel 102 forming the gasket plate 100.

As will be apparent from FIG. 2*a*, the supporting elevations 22' associated with the screw holes and enclosing the screw holes in the shape of a ring, in the second embodiment, are in the form of folded-over areas, i.e., they were produced by the hole rim area of the sheet metal layer 102 being respectively folded over through 180° around the screw holes and laid back onto the sheet metal layer. However, these could also be sheet metal rings which are placed on the layer of sheet steel 102 and joined to it by, for example, spot welding.

Figure 2B:
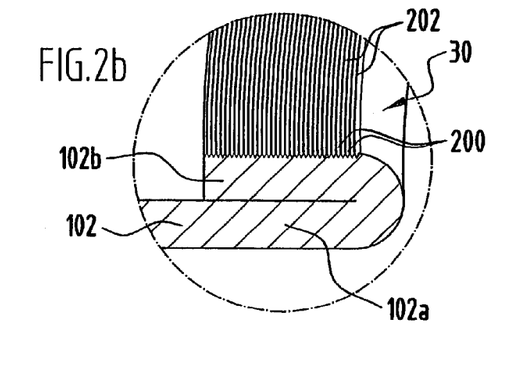
FIG. 2b shows the detail "C" from FIG. 2a on a larger scale.

In conjunction with the second embodiment, FIG. 2*b* shows how the fitted sheet steel ring 34 may be replaced by a folded-over area 102*b* of the layer of sheet steel 102, and the metallic main body of the combustion chamber sealing elements 30, which may be provided with a coating, can be provided on its side facing the adjacent engine component sealing surface (of course, with the gasket installed) with anti-abrasion means, which minimize or totally prevent sliding movements between the cylinder head gasket and the engine component sealing surface. In the case of the embodiment shown in FIG. 2*b*, the anti-abrasion means are in the form of grooves 200 and ribs 202 stamped into the upper side of the combustion chamber sealing element 30, which respectively have an approximately triangular cross section and enclose the associated combustion chamber opening in the form of closed concentric rings. A thin, in particular, elastomeric coating serving the purpose of microsealing may also be applied to the thus obtained surface profile, but the surface profile should not be leveled by this. However, a coating which increases the sliding friction with respect to the adjacent engine component sealing surface and, for example, consists of a plastic matrix with fine conundrum particles embedded therein may be substituted for the surface profile. As an alternative to the above-described embodiments, the anti-abrasion means could, however, also consist of a coating forming a slide layer, which ensures easy displaceability of the areas of the gasket and the adjacent engine component sealing surface lying against one another and in this way prevents or at least minimizes frictional wear. A PTFE coating is, for example, conceivable for this purpose.

Figure 3:
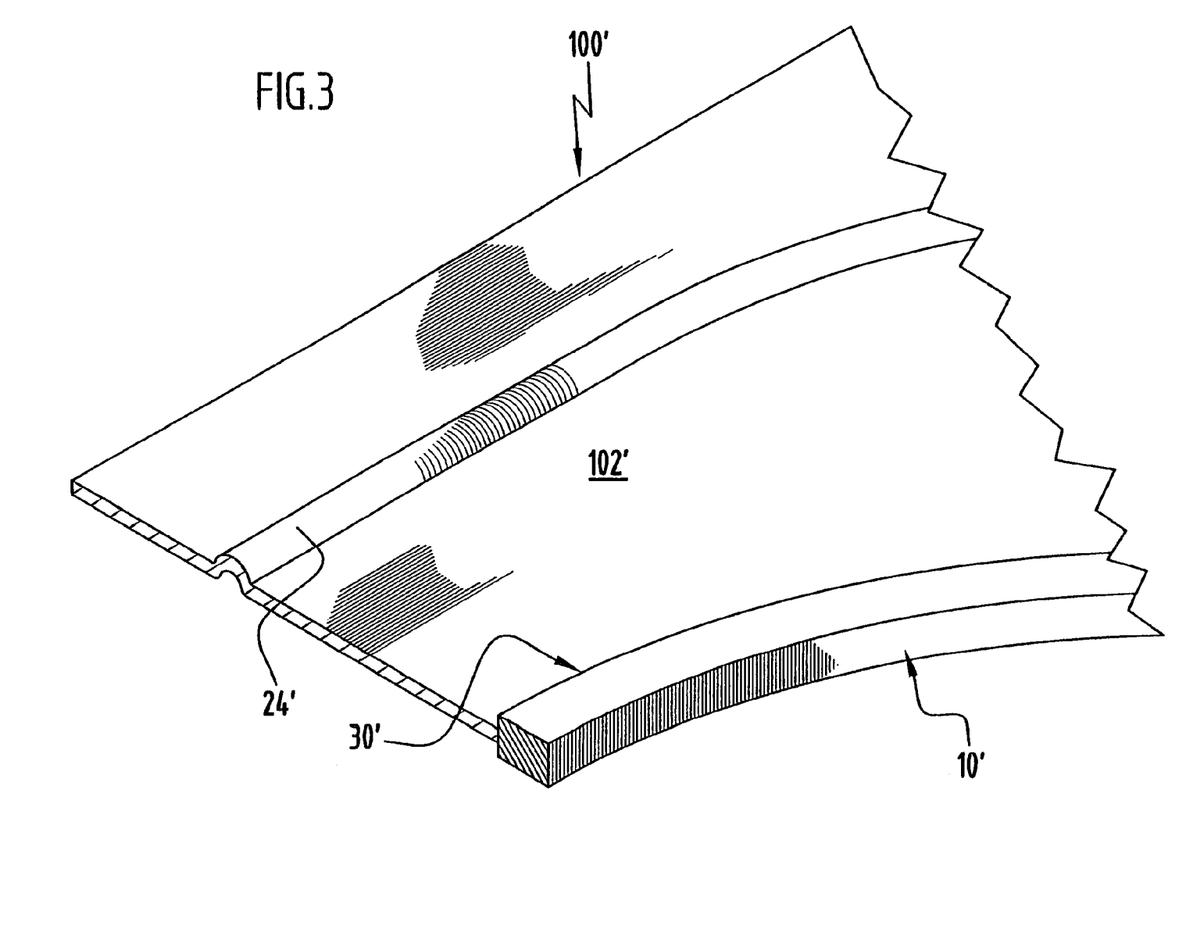
FIG. 3 shows a representation, corresponding to FIG. 1a, of a third embodiment.

Again, the third embodiment shown in FIG. 3 will only be described insofar as it differs from the first embodiment according to FIG. 1. In FIG. 3, the gasket plate was designated 100' and the watertight bead 24'. A combustion chamber sealing element 30' enclosing a combustion chamber opening 10' is in the form of a separate steel ring, in particular, of approximately rectangular cross section, which is inserted into a punched-out opening in the layer of sheet steel 102' otherwise forming the gasket plate 100' and is welded to the layer of sheet steel 102', in particular, by a circumferential weld seam closed within itself. In this embodiment, the combustion chamber sealing element 30' projects on either side of the gasket plate 100' above the gasket plate 100' and thereby forms an elevation on either side of the cylinder head gasket, and the combustion chamber sealing element 30' may be provided with a height profile corresponding to the sealing gap topography on both the top side and the underside of the cylinder head gasket. In this embodiment, the steel ring forms the main body of both aforementioned elevations.

Figure 4:
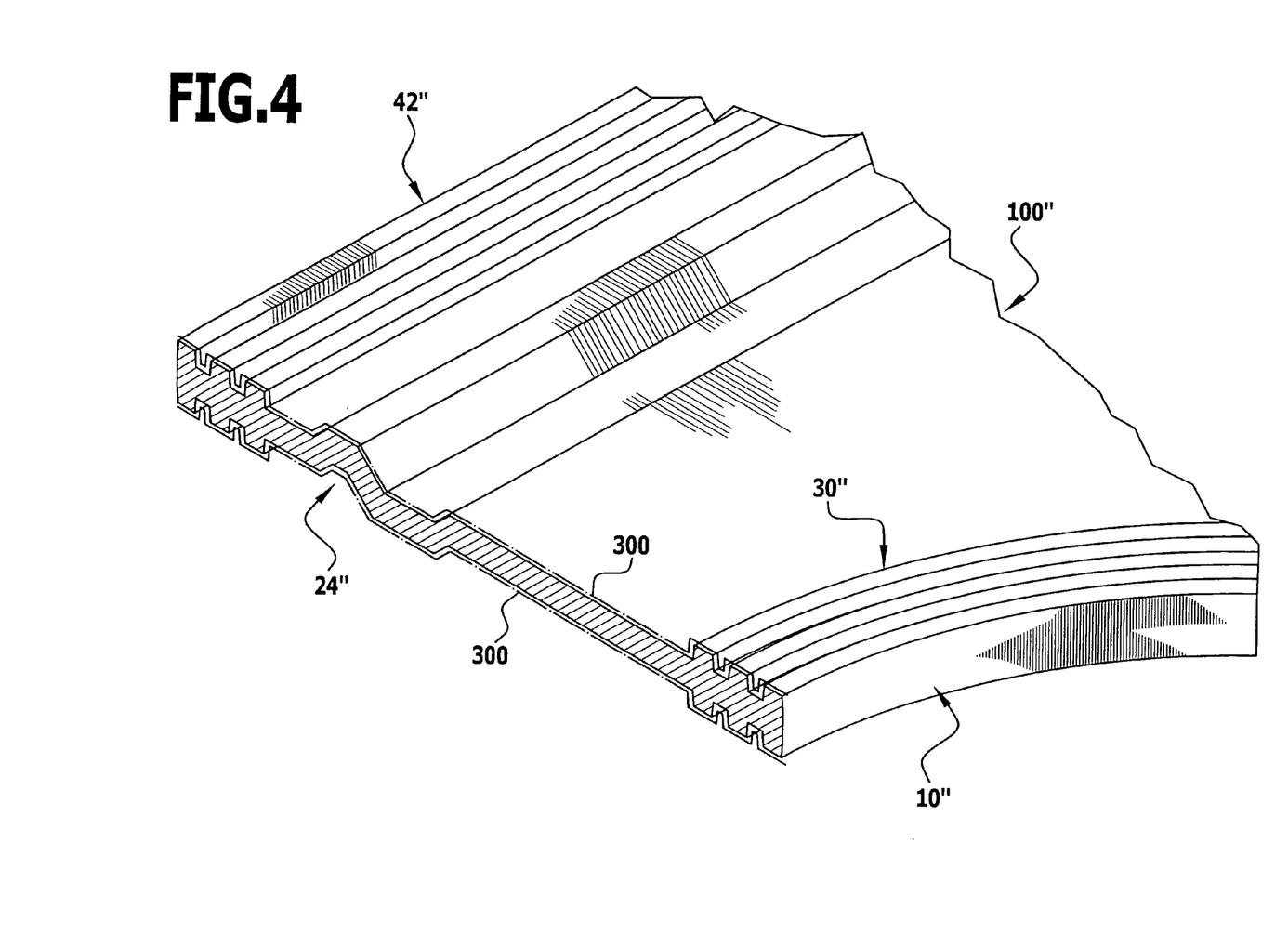
FIG. 4 shows a representation, corresponding to FIG. 3, of a fourth embodiment.

In the embodiment shown in FIG. 4, the gasket plate 100" is to have been made from a steel sheet which is deformable by stamping at least in the initial state so as to be able to produce a combustion chamber sealing element 30" enclosing the combustion chamber opening 10" in the shape of a ring, a peripheral supporting elevation 42", and a sealing bead such as a watertight bead 24" by stamping. If the steel sheet used for producing the gasket plate 100" has sufficient elasticity for the function of the bead 24", no further measures are required such as, for example, heat treatment. Otherwise, the material of the gasket plate 100" may be subjected to suitable heat treatment in those areas in which the gasket plate is to be provided with beads which are elastically deformable in their height. In the fourth embodiment shown in FIG. 4, the combustion chamber sealing element 30" also forms elevations on both sides of the gasket plate 100". In addition, the combustion chamber sealing element 30" may—as shown in FIG. 4—be provided with a surface profile, which facilitates the stamping procedure (namely the displacement of material involved therein) and/or forms anti-abrasion means. To facilitate the stamping procedure, the supporting elevations of the fourth embodiment may also be provided with profiles, as illustrated in the case of the supporting elevation 42" in FIG. 4.

Finally, coatings 300 were indicated by dot-and-dash lines in FIG. 4. These are to serve, in particular, as so-called microsealing, so that tiny unevennesses in the engine component sealing surfaces will not lead to leakages.

Figure 5:
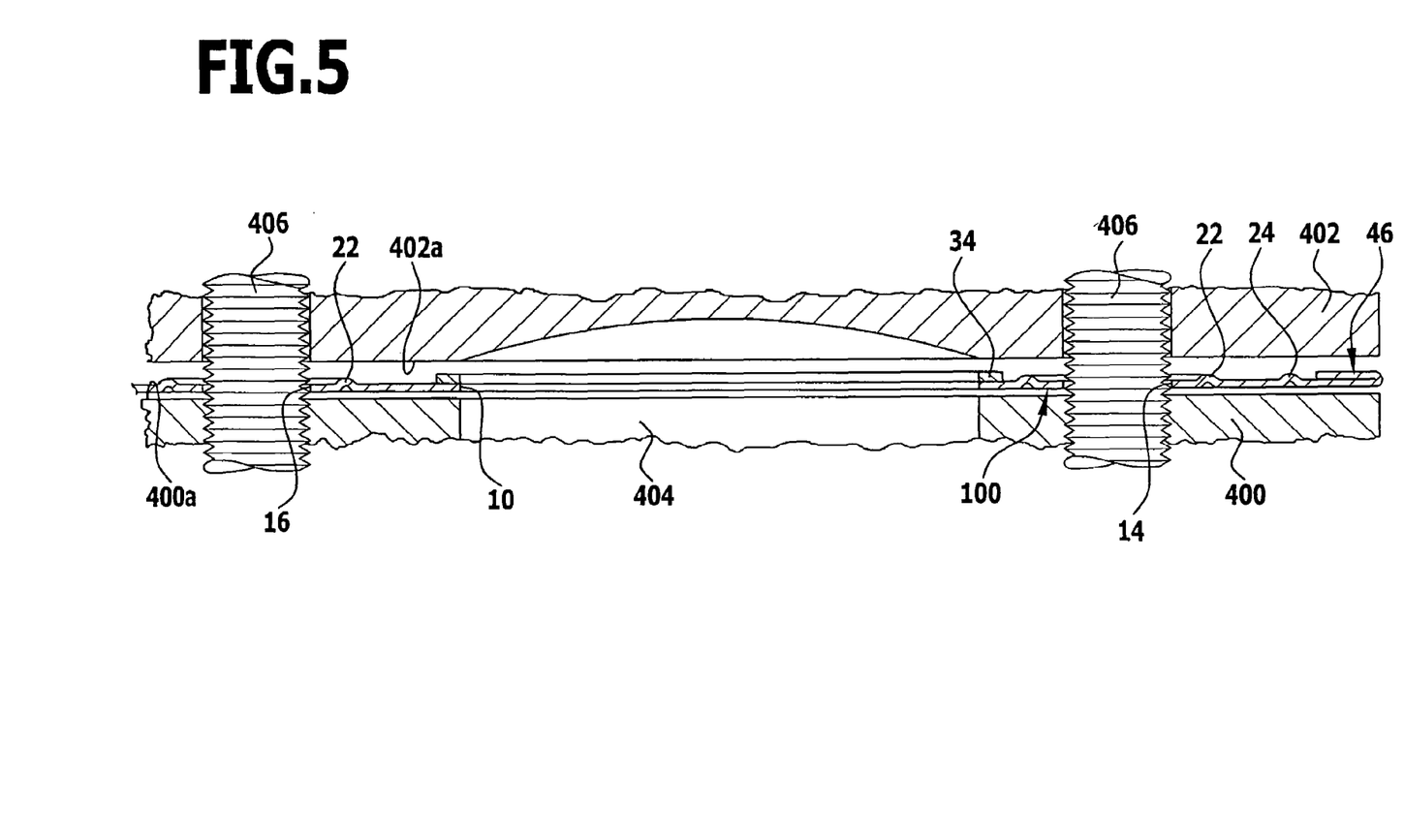
FIG. 5 shows a sectional view of the cylinder head gasket of FIG. 1 along line 5-5 in FIG. 1, together with adjacent portions of a cylinder head and an engine block and portions of cylinder head screws for mounting the cylinder head on the engine block and for clamping the cylinder head gasket between sealing surfaces of the engine components cylinder head and engine block.

FIG. 5 shows sections of an engine block 400 and of a cylinder head 402, each having a sealing surface 400*a* and 402*a*, respectively, between which the gasket plate 100 of the cylinder head gasket shown in FIGS. 1 and 1*a* is positioned. A combustion chamber formed by the engine block 400 and the cylinder head 402 is depicted by 404. Further, FIG. 5 shows sections of cylinder head screws 406 by which the cylinder head 402 is mounted at the engine block 400 and the cylinder head gasket clamped between the sealing surfaces 400*a* and 402*a*. In FIG. 5, the cylinder head screws 406 are not yet tightened, so that the cylinder head gasket is not yet clamped between the engine component sealing surfaces 400*a* and 402*a*.

The invention claimed is:

1. Cylinder head gasket for sealing off a sealing gap delimited by engine component sealing surfaces of at least one cylinder head and an engine block of an internal combustion engine, said engine component sealing surfaces defining a topography of the sealing gap, said cylinder head gasket comprising a substantially metallic gasket plate defining a gasket plate plane and having at least one combustion chamber opening, screw openings for cylinder head screws and at least one fluid opening, characterized by the combination of the following features:

(a) the gasket plate has only one layer of sheet steel extending over the entire gasket plate;
    (b) a combustion chamber sealing element is provided around the combustion chamber opening, said combustion chamber sealing element forming on at least one side of the cylinder head gasket an elevation with a gasket sealing surface surrounding only this combustion chamber opening in a closed manner for being pressed against at least one of the engine component sealing surfaces, said gasket sealing surface varying in height relative to said gasket plate plane so that said gasket sealing surface has a height profile formed prior to installation of the cylinder head gasket so as to correspond at least approximately to the topography of the sealing gap to be sealed off as a result of clamping of the cylinder head gasket between the engine component sealing surfaces, said elevation having a metallic main body whose material is selected and whose cross section is designed such that the main body is pressure resistant and creepresistant and therefore not deformable in its height under a maximum load occurring with the cylinder head gasket installed and the engine operating;

(c) for the at least one fluid opening, the gasket plate is provided with at least one sealing bead surrounding the fluid opening in a closed manner and being elastically deformable in a direction perpendicular to the gasket plate.

2. Cylinder head gasket in accordance with claim 1, wherein the main body is provided with anti-abrasion means in the area of gasket sealing surface.

3. Cylinder head gasket in accordance with claim 2, wherein said anti-abrasion means is a slide layer.

4. Cylinder head gasket in accordance with claim 2, wherein said anti-abrasion means is a coating which increases the sliding friction in relation to the adjacent engine component sealing surface.

5. Cylinder head gasket in accordance with claim 2, wherein the main body has in the area of the gasket sealing surface a surface profile for preventing sliding movement in relation to the adjacent engine component sealing surface, said surface profile constituting said anti-abrasion means.

6. Cylinder head gasket in accordance with claim 5, wherein the surface profile is formed by ribs and grooves enclosing the combustion chamber in the shape of rings.

7. Cylinder head gasket in accordance with claim 5, wherein the main body is provided in the area of the gasket sealing surface with a coating consisting of an elastomeric material for microsealing purposes, which does not level the surface profile.

8. Cylinder head gasket in accordance with claim 1, wherein the sheet steel layer consists of a sheet of spring steel at least in the area of the sealing bead.

9. Cylinder head gasket in accordance with claim 1, wherein the gasket plate is provided at a distance from the at least one combustion chamber opening and its combustion chamber sealing element with at least one elevation forming a support for at least one of the cylinder head and the engine block.

10. Cylinder head gasket in accordance with claim 9, wherein the supporting elevation has a height profile corresponding to the topography of the sealing gap.

11. Cylinder head gasket in accordance with claim 9, wherein at least one of the screw openings is provided with a supporting elevation.

12. Cylinder head gasket in accordance with claim 9, wherein at least one supporting elevation is provided in the area of the periphery of the gasket plate.

13. Cylinder head gasket in accordance with claim 1, wherein the elevation is formed by a folded-over area of the layer of sheet steel.

14. Cylinder head gasket in accordance with claim 1, wherein the elevation is formed by an overlay of sheet metal joined to the layer of sheet steel.

15. Cylinder head gasket in accordance with claim 1, wherein the elevation is formed by a metal ring which is placed in an opening in the layer of sheet steel and joined thereto.

16. Cylinder head gasket in accordance with claim 1, wherein the elevation is formed by a stamped, thickened area of the layer of sheet steel.

* * * * *